(12) United States Patent
Andersson et al.

(10) Patent No.: US 7,198,028 B2
(45) Date of Patent: Apr. 3, 2007

(54) IGNITION TIMING CONTROL SYSTEM FOR LIGHT DUTY COMBUSTION ENGINES

(75) Inventors: Martin N. Andersson, Caro, MI (US); Kevin P. Born, Cass City, MI (US); Michael P. Burns, Millington, MI (US); George M. Pattullo, Caro, MI (US)

(73) Assignee: Walbro Engine Management, L.L.C., Tucson, AZ (US)

( * ) Notice: Subject to any disclaimer, the term of this patent is extended or adjusted under 35 U.S.C. 154(b) by 0 days.

(21) Appl. No.: 11/211,835

(22) Filed: Aug. 25, 2005

(65) Prior Publication Data

US 2005/0279326 A1  Dec. 22, 2005

Related U.S. Application Data

(63) Continuation-in-part of application No. 10/765,415, filed on Jan. 27, 2004, now Pat. No. 7,000,595, which is a continuation-in-part of application No. 10/186,522, filed on Jul. 1, 2002, now abandoned.

(60) Provisional application No. 60/306,381, filed on Jul. 18, 2001.

(51) Int. Cl.
*F02P 5/145* (2006.01)

(52) U.S. Cl. .................................. 123/339.11

(58) Field of Classification Search ........... 123/339.11, 123/406.47, 406.5, 406.51, 406.57, 406.59, 123/478, 438, 480, 491, 103, 110

See application file for complete search history.

(56) References Cited

U.S. PATENT DOCUMENTS

| | | | |
|---|---|---|---|
| 3,861,366 A | | 1/1975 | Masaki et al. |
| 4,111,174 A | * | 9/1978 | Fitzner et al. ......... 123/339.11 |
| 4,446,832 A | * | 5/1984 | Matsumura et al. ... 123/339.11 |
| 4,532,903 A | | 8/1985 | Staerzl et al. |
| 4,721,083 A | | 1/1988 | Hosaka |
| 4,784,096 A | | 11/1988 | Eberline |
| 4,799,469 A | | 1/1989 | Nagano et al. |
| 5,031,593 A | | 7/1991 | Erhard et al. |
| 5,050,553 A | | 9/1991 | Erhard |

(Continued)

FOREIGN PATENT DOCUMENTS

EP   0 059 586 A   9/1982

(Continued)

*Primary Examiner*—Andrew M. Dolinar
*Assistant Examiner*—Johnny H. Hoang
(74) *Attorney, Agent, or Firm*—Reising, Ethington, Barnes, Kisselle, P.C.

(57) ABSTRACT

A control system for a low cost, light duty combustion engine, where the control system generally utilizes an engine speed input signal and independent operating sequences to determine a desired ignition timing. There are several independent operating sequences, each one of which is designed to optimally control the engine under certain conditions. These operating sequences include a Cranking sequence, a Warm Up sequence, a Normal Mode sequence, an Acceleration sequence, a Come Down sequence, a Recovery Bump sequence, and a Part Throttle sequence. During idling conditions, the Normal Mode sequence uses rapid changes in the ignition timing to maintain the engine speed in a small, idle engine speed range. By utilizing these operational sequences, the control system improves the performance of a low cost, light duty engine across a wide array of conditions.

19 Claims, 12 Drawing Sheets

U.S. PATENT DOCUMENTS

| | | |
|---|---|---|
| 5,191,531 A | 3/1993 | Kurosu et al. |
| 5,498,217 A | 3/1996 | Maruyama et al. |
| 5,753,148 A | 5/1998 | King et al. |
| 5,775,297 A | 7/1998 | Koike et al. |
| 5,984,281 A | 11/1999 | Hacker et al. |
| 6,109,235 A | 8/2000 | Hoshiba et al. |
| 6,202,989 B1 | 3/2001 | Pattullo |
| 6,240,894 B1 | 6/2001 | Enoki et al. |
| 6,273,065 B1 | 8/2001 | Carpenter |
| 6,526,946 B1 | 3/2003 | Kanno |
| 2005/0073627 A1 | 4/2005 | Akiyama |

FOREIGN PATENT DOCUMENTS

| | | |
|---|---|---|
| EP | 0 853 189 A | 7/1998 |
| JP | 63-239372 A | 10/1988 |
| JP | A-6-250169 | 9/1994 |
| JP | A-10-293212 | 11/1998 |
| JP | A-2002-189230 | 7/2002 |
| JP | A-2004-4462 | 1/2004 |
| WO | WO 03/029884 A1 | 4/2003 |

* cited by examiner

IGNITION TIMING CONTROL SYSTEM FOR LIGHT DUTY COMBUSTION ENGINES

REFERENCE TO RELATED APPLICATION

This application is a continuation-in-part of U.S. application Ser. No. 10/765,415, filed Jan. 27, 2004, now U.S. Pat. No. 7,000,595 which is a continuation-in-part of U.S. application Ser. No. 10/186,522, filed Jul. 1, 2002, now abandoned all of which claim the benefit of provisional application, Ser. No. 60/306,381, filed Jul. 18, 2001.

FIELD OF THE INVENTION

The present invention relates generally to a control system for use with a light duty combustion engine, and more specifically, an ignition timing control system.

BACKGROUND OF THE INVENTION

Ignition timing, also referred to as spark timing, can be an important aspect in the performance of an internal combustion engine. Generally, ignition timing relates to how early or late the spark plug fires in relation to the axial position of the piston within the cylinder.

For instance, when the engine is being operated at high speeds, it is desirable to initiate the combustion process early such that the combustion reaction has adequate time to develop and assert its force upon the piston. Thus, an ignition timing control system delivers a spark to the combustion chamber before the piston reaches a top-dead-center (TDC) position, an occurrence commonly referred to as timing advance. Conversely, if the engine is being operated at relatively low speeds, the control system instructs the spark plug to fire at a point closer to TDC (either slightly before or slightly after). In the case where the spark plug fires slightly after TDC, a timing retard has occurred and allows less time for the combustion process to develop. Manipulation of the ignition timing can be helpful for obtaining optimum performance.

An example of an ignition timing control system for use with a low cost, light duty combustion engine is disclosed in U.S. patent application Ser. No. 10/186,522, which is assigned to the present assignee and is hereby incorporated by reference. That application discloses a control system that generally utilizes an engine speed input signal and independent operating sequences to determine a desired ignition timing and an air-to-fuel ratio for a combustible mixture. There are several independent operating sequences, each one of which is designed to optimally control the engine under certain conditions. By utilizing these operational sequences and an engine speed input signal, the control system is able to improve the engine performance and emissions across a wide array of conditions.

SUMMARY OF THE INVENTION

According to an embodiment of the invention, there is provided a control system for use with a light duty combustion engine that includes an input for receiving an electronic speed signal, an output for providing an electronic ignition signal, and an electronic processing device. The control system is capable of monitoring the engine speed and rapidly changing the ignition timing so that the engine speed is generally maintained in an idle engine speed range when the engine is idling.

According to another aspect of the invention, there is provided a method for controlling the ignition timing of a light duty combustion engine. That method includes the steps of: (a) receiving an electronic speed signal, (b) providing an electronic ignition signal, and (c) rapidly changing the ignition signal when the speed signal indicates that the engine speed is not within an idle engine speed range so that the engine is encouraged to return to the idle engine speed range.

According to another aspect of the invention, there is provided a control system for use with a light duty combustion engine. The control system includes a speed sensor operatively coupled to the engine for providing an electronic speed signal, an ignition switch operatively coupled to a capacitive discharge ignition system and receiving an ignition signal, and an electronic processing device for receiving the speed signal and providing the ignition signal. The control system is capable of: i) rapidly changing the ignition timing with the ignition signal so that the engine speed is generally maintained in an idle engine speed range when the engine is idling, and ii) providing the ignition signal according to a part throttle sequence that is initiated when the speed signal indicates that the engine speed has remained in a predetermined engine speed range for a predetermined number of engine revolutions.

Object, features, and advantages of this invention include providing an ignition timing control system which improves the operating performance and emissions for a light duty combustible engine, improves the stability of the engine during idle, improves the performance of the engine during a part throttle condition, and is of relatively simple design, economical manufacture and assembly and in service has a long useful life.

BRIEF DESCRIPTION OF THE DRAWINGS

These and other objects, features and advantages will be apparent from the following detailed description of the preferred embodiments, appended claims and accompanying drawings in which:

DETAILED DESCRIPTION OF THE PREFERRED EMBODIMENT

Figure 1:
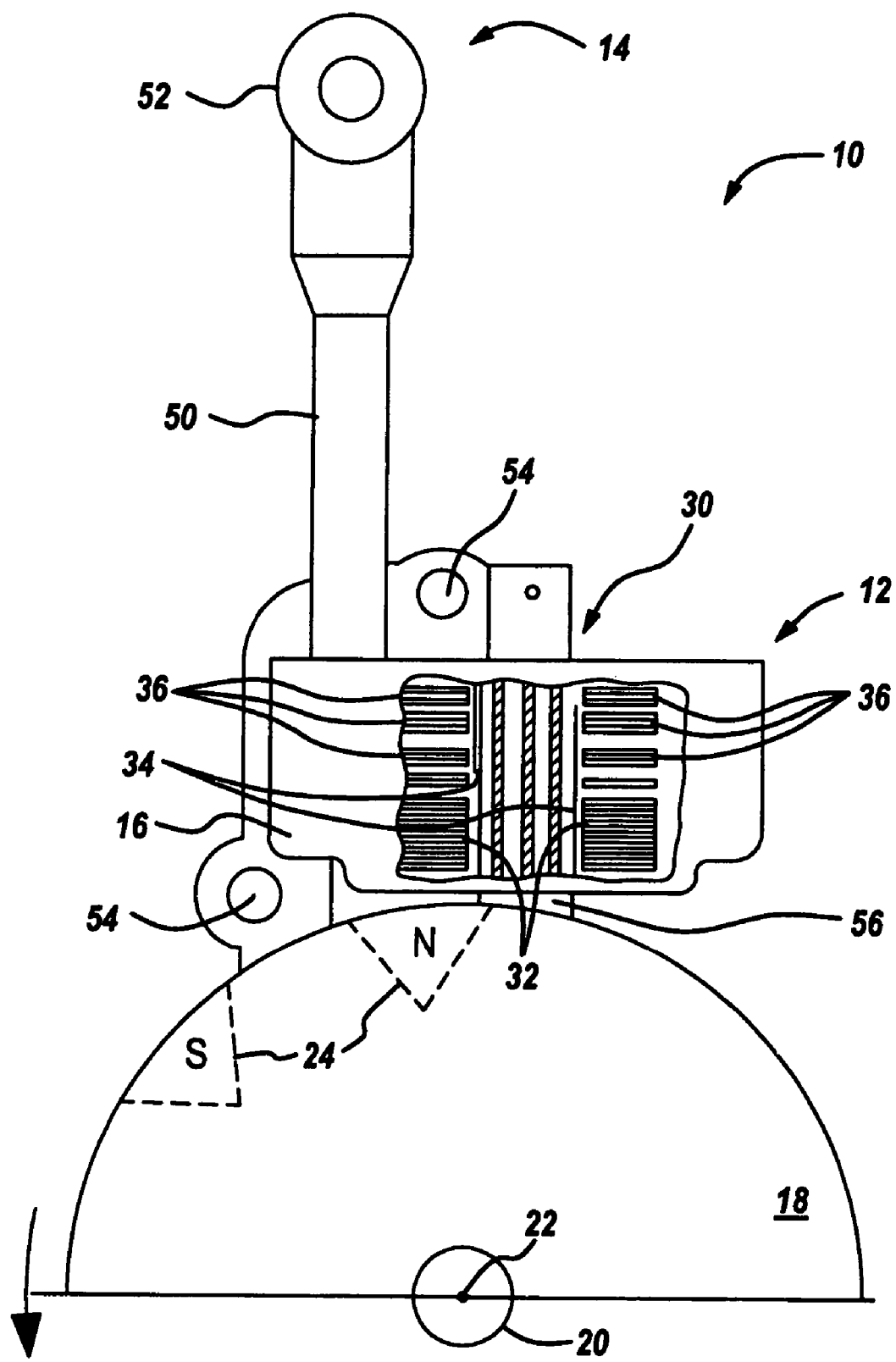
FIG. 1 is an elevation view of an embodiment of a signal generation system, including a cutaway section showing parts of a control system.

Referring to FIG. 1, there is shown an embodiment of a signal generation system 10 for use with a low cost, light duty combustion engine, such as the type typically employed by lawn and garden equipment. The term 'light duty combustion engine' used herein broadly includes all types of non-automotive combustion engines, including two- and four-stroke engines used with hand-held power tools, lawn and garden equipment, lawnmowers, weed trimmers, edgers, chain saws, snowblowers, personal watercraft, boats, snowmobiles, motorcycles, all-terrain-vehicles, etc.

Signal generation system 10 could be constructed according to one of numerous designs, but preferably includes a control system 12, an ignition lead 14, and a housing 16. Signal generation system 10 interacts with a flywheel 18, which is a weighted disk-like component that is coupled to a crankshaft 20 and rotates about an axis 22 under the power of the engine. By using its rotational inertia, the flywheel 18 moderates fluctuations in engine speed, thereby providing a more constant and even output. Furthermore, flywheel 18 includes magnets or magnetic sections 24 located near its outer periphery. Once the flywheel is rotating, these magnetic sections spin past and electromagnetically interact with components of control system 12 such that a signal indicative of the rotational speed of the flywheel, and hence the engine, is induced. This signal can be used to keep track of the number of engine revolutions and plays a role in the operation of the ignition timing control, as will be subsequently explained.

Figure 2:
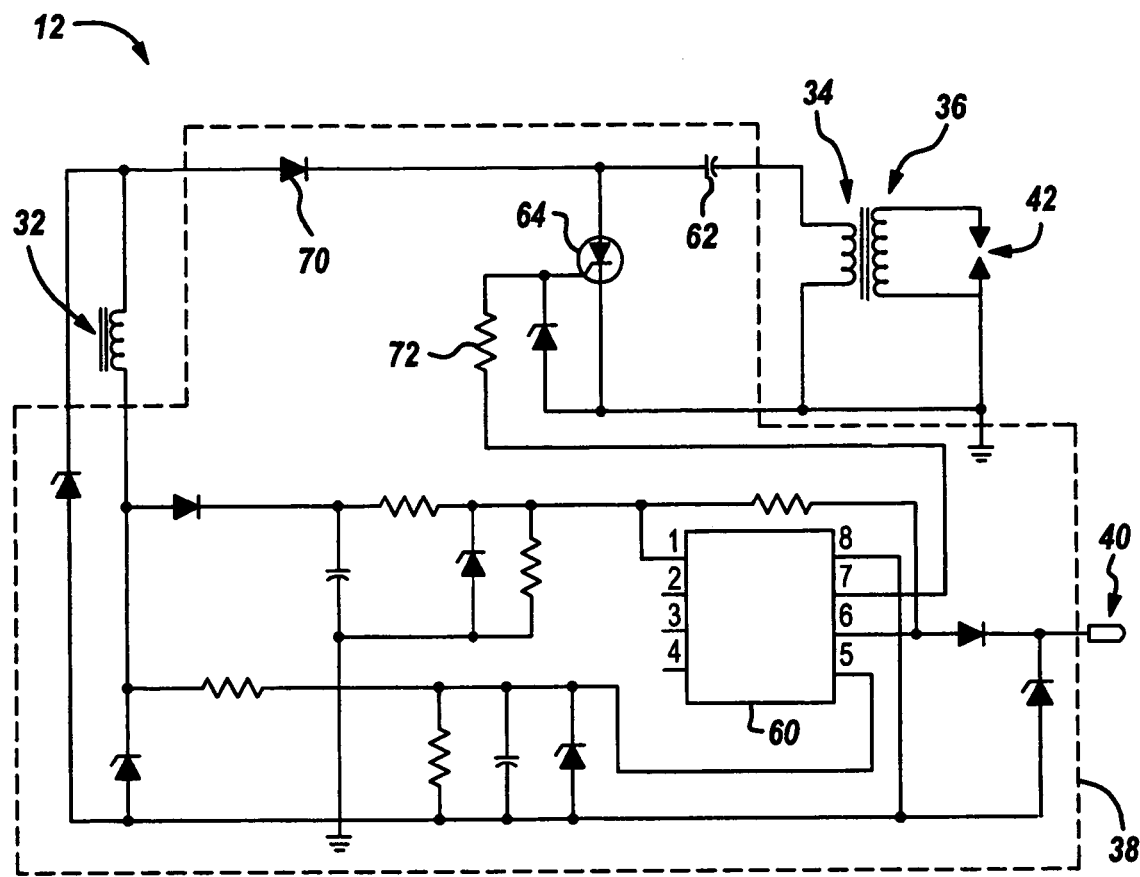
FIG. 2 is a schematic view of an embodiment of the control system of FIG. 1.

Control system 12 is generally responsible for managing the ignition timing of the engine, and comprises a lamstack 30, a charge winding 32, a primary ignition winding 34, a secondary ignition winding 36, a control circuit 38 and a kill-switch 40 (both shown in FIG. 2). As magnetic sections 24 rotate past lamstack 30, which is a stack of ferromagnetic or magnetically permeable laminate pieces, a magnetic field is introduced in the lamstack which, in turn, causes a voltage in charge winding 32. Preferably, charge winding 32 circumferentially surrounds the lamstack such that the lamstack is generally positioned along the center axis of the charge winding. Primary ignition winding 34 also circumferentially surrounds the lamstack and inductively interacts with a secondary ignition winding 36. As is commonly known in capacitive discharge ignition systems, a spark is created in a spark plug 42 by discharging a capacitor across primary winding 34, such that it induces a high voltage pulse in secondary winding 36. Kill-switch 40 provides the user with a quick, easy to use means for shutting off the engine, and is preferably a 'positive stop/automatic on' type switch. A more detailed account of control system 12 will be subsequently provided in conjunction with FIG. 2.

Ignition lead 14 couples control system 12 to spark plug 42 so that the control system can send high voltage ignition pulses to the spark plug, and generally includes an elongated copper wire connector 50 and a boot 52. Connector 50 conducts the high voltage ignition pulse along an electrical conductor surrounded by a protective insulated sheathing. The boot 52 is designed to receive the terminal end of the spark plug, such that the two components are both physically secured to each other and electrically connected. Of course, numerous types of boots are known to those skilled in the art and could be used to accommodate a variety of spark plug terminal ends.

Housing 16 protects the components of control system 12 from what is oftentimes a harsh operating environment, and generally includes several mounting features 54. The housing, which can be made from metal, plastic or any other suitable material, surrounds lamstack 30 and allows for a small air gap 56 to exist between the lamstack and the outer periphery of flywheel 18. The air gap should be small enough to allow for sufficient electromagnetic coupling, yet large enough to account for tolerance variances during operation. The mounting features 54 shown here are holes designed to accommodate corresponding bolts, however, suitable alternative mounting features could be used in their place.

In engine operation, the movement of a piston turns crankshaft 20, which in turn rotates flywheel 18. As the magnetic sections 24 of the flywheel rotate past lamstack 30, a magnetic field is created which induces a voltage in the nearby charge winding 32; this induced voltage is used for several purposes. First, the voltage provides power to control circuit 38 so that it may operate. Second, the induced voltage charges a capacitor that stores the energy until it is instructed to discharge, at which time energy is discharged across primary ignition winding 34. Lastly, the voltage induced in charge winding 32 produces an engine speed signal which is supplied to an electronic processing device of control circuit 38. This engine speed signal plays a role in the ignition timing control, as will be subsequently explained in greater detail.

DESCRIPTION OF CONTROL CIRCUIT

Turning now to FIG. 2, control system 12 includes a control circuit 38 for managing the ignition timing of a light duty combustion engine. Of course, the particular control circuit embodiment shown here is but one example of the type of circuit that may be included within control system 12, as other embodiments of the control circuit also exist. Control circuit 38 interacts with the other elements of control system 12, and generally includes an electronic processing device 60, an ignition discharge capacitor 62, and an ignition switching device 64.

Electronic processing device 60 is preferably an 8-pin, 4 MHz processor, such as model # 12C509 produced by Microchip, Inc., and utilizes 1024 Kb of memory to store the firmware that governs the ignition timing, as well as memory for different variables. The term 'electronic processing device' broadly includes all types of microcontrollers, microprocessors, as well as any other type of electronic device capable of executing electronic instructions. Pin 1 of electronic processing device 60 is coupled to charge winding 32 via a resistor and diode, such that an induced voltage in the charge winding is rectified and supplies the electronic processing device with power. Also, when a voltage is induced in the charge winding 32, as previously described, current passes through a diode 70 and charges ignition discharge capacitor 62, assuming ignition switching device 64 is in a non-conductive state. The ignition discharge capacitor 62 holds the charge until electronic processing device 60 changes the state of ignition switching device 64, at which time the energy stored in the capacitor is discharged. Pin 5 of electronic processing device 60 is also coupled to charge winding 32 and receives an electronic signal representative of the engine speed. The engine speed signal can be used to select a particular operating sequence, the selection of which affects the desired spark timing, as will be subsequently explained in greater detail. Pin 6 is coupled to kill switch 40, which acts as a manual override for shutting down the engine. Pin 7 is coupled to the gate of ignition switching device 64 via a resistor 72, and transmits an ignition signal which controls the state of the switching device. When the ignition signal on pin 7 is low, the ignition switching device 64 is nonconductive and capacitor 62 is allowed to charge. When the ignition signal is high, the ignition switching device is conductive and capacitor 62 is allowed to discharge through primary winding 34, thus inducing an ignition pulse in secondary winding 36 which is sent to spark plug 42. Thus, electronic processing device 60 governs the discharge of ignition discharge capacitor 62 by controlling the conductive state of ignition switching device 64. Lastly, pin 8 provides the electronic processing device with a ground reference.

In operation, charge winding 32 experiences an induced voltage that charges ignition discharge capacitor 62, and provides electronic processing device 60 with power and an engine speed signal. As capacitor 62 is being charged, the electronic processing device 60 executes a series of instructions that utilize the engine speed signal to determine if and how much of a spark advance or retard is needed. The electronic processing device then outputs an ignition signal on pin 7, according to the calculated ignition timing, which turns on switching device 64. Once turned on (meaning a conductive state), a current path through switching device 64 and primary winding 34 is formed for the charge stored in capacitor 62. The current through the primary winding induces a high voltage ignition pulse in secondary winding 36. This high voltage pulse is then delivered to spark plug 42 where it arcs across the spark gap, thus beginning the combustion process. If at any time kill switch 40 is activated, the electronic processing device stops and thereby prevents the control system from delivering a spark to the combustion chamber.

Description of Firmware

Control system 12, more specifically electronic processing device 60, executes a series of electronic instructions, also called firmware, which calculate the ignition timing for the engine. The firmware preferably includes a number of different operating sequences which are groups of instructions, similar to sub-routines, designed to optimally control the ignition timing under certain operating conditions. An Overall Timing value, which ultimately dictates the ignition timing for the engine, is the sum of an Advance value and a BaseTime value. The Advance value represents normal ignition timing and is generally unaffected by the different operating sequences, while the BaseTime value is determined by the specific operating sequence being executed. The Overall Timing value may vary from about 45° before TDC to about 15° after TDC.

Figure 3:
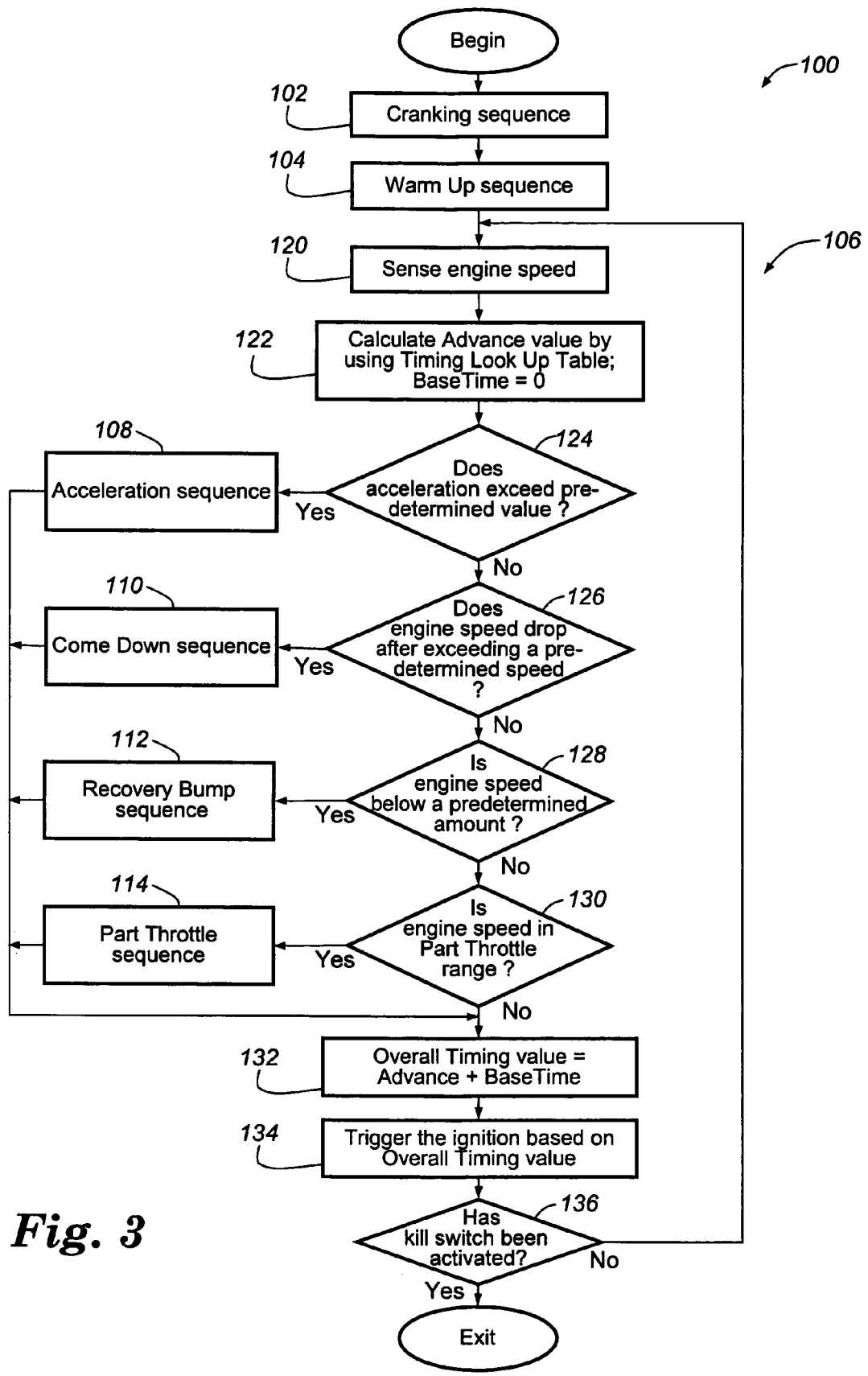
FIG. 3 is a flowchart showing an embodiment of the overall operation of the firmware that may be used with the control system of FIG. 1.

Referring to FIG. 3, the overall operation 100 of the control system of the present invention is shown from when the engine is initially started until the operator engages the kill switch to shut the engine off. The operational sequences seen are groups of instructions, similar to sub-routines, that are designed to optimally control the ignition timing in light of current conditions, and generally include a Cranking sequence 102, a Warm Up sequence 104, a Normal Mode sequence 106, an Acceleration sequence 108, a Come Down sequence 110, a Recovery Bump sequence 112, and a Part Throttle sequence 114.

After being initially turned on, the engine ignition timing is controlled by the Cranking sequence 102, which is designed to get the engine started and is only in control of the ignition timing for a small number of engine revolutions. Following the Cranking sequence is the Warm Up sequence 104, which is designed to bring the engine to a normal operating environment. Unlike the Cranking sequence 102, which only controls the ignition timing for a small, predetermined number of engine revolutions, the Warm Up sequence 104 controls the ignition timing until either the speed of the engine surpasses a predetermined value or the ignition timing BaseTime value has been reduced to zero. Once the engine has cycled through the Cranking and Warm Up sequences, the Normal Mode sequence 106 is initiated. The Normal Mode or Idle Stability sequence 106 is the operational mode that the control system is in when no unique circumstances, such as unusually low engine speeds, cause the control system to enter one of the other specific operational sequences. For the ignition timing, the Normal Mode sequence 106 simply uses an engine speed versus timing look up table to determine the Advance value and sets the BaseTime value to zero. If the Normal Mode ever detects an increase in engine speed exceeding a predetermined rate, the Acceleration sequence 108 is initiated. The Acceleration sequence 108 advances the ignition timing and after completion will return operating control to the Normal Mode. From the Normal Mode, if a sufficient engine speed is sensed followed by a decrease in speed, the Come Down sequence 110 may be called upon. The Come Down sequence 110 temporarily manipulates the ignition timing to improve the engine's ability to quickly return from higher to lower RPMs. After completion of the Come Down sequence 110, the Normal Mode will control operation but will transfer control to the Recovery Bump sequence 112 if the engine speed dips below a predetermined level. The Recovery Bump is used to improve the engine's ability to recover from a low RPM condition which may otherwise result in engine stall, and will return control to the Normal Mode upon completion. If the Normal Mode detects that the engine speed is in a part throttle range, then the Part Throttle sequence 114 will be initiated.

Normal Mode or Idle Stability sequence 106 begins after the Cranking and Warm Up sequences 102, 104 have been completed. Step 120 is the first step of the Normal Mode sequence and it samples and stores the current speed of the engine, as is done for each engine revolution. A count of engine revolutions can also be determined from the engine speed signal, and vice-versa. Thus, by sampling either an engine speed signal or an engine revolution counter, both parameters would be known. Step 122 utilizes the engine speed reading by referring to a look up table that relates engine speed to ignition timing. Although different engines and applications may require different tables, it is an objective of Normal Mode sequence 106 to generally maintain the engine speed in a fairly small RPM range, hereafter referred to as the "idle engine speed range," when the engine is idling. The timing value referenced for a particular engine speed is preferably the Advance value previously discussed. Step 122 also sets the BaseTime value to zero, thus making the Overall Timing value (Advance+BaseTime) equal to the Advance value. The following timing table is an example of a typical and preferred timing table, although modifications can of course be made to it.

| RPM | Ignition Timing |
| --- | --- |
| 500 | 2° BTDC |
| 800 | 2° BTDC |
| 1,000 | 2° BTDC |
| 1,500 | 4° BTDC |
| 2,000 | 10° BTDC |
| 2,500 | 35° BTDC |
| 2,900 | 2° BTDC |
| 3,100 | 2° BTDC |
| 3,500 | 20° ATDC |
| 4,000 | 0° BTDC |
| 4,500 | 9° BTDC |
| 5,000 | 17° BTDC |
| 5,500 | 23° BTDC |
| 6,000 | 26° BTDC |

-continued

| RPM | Ignition Timing |
| --- | --- |
| 6,500 | 28° BTDC |
| 7,000 | 28° BTDC |
| 7,500 | 28° BTDC |
| 8,000 | 28° BTDC |
| 8,500 | 28° BTDC |
| 9,000 | 28° BTDC |
| 9,500 | 28° BTDC |

During idling conditions, Normal Mode 106 generally maintains the engine speed in the idle engine speed range (between 2,900–3,100 RPMs in the preferred embodiment) by providing a steep timing advance (35° BTDC) and a steep timing retard (20° ATDC) on the low and high side, respectively, of the idle engine speed range, in which the timing is a modest, relatively uniform 2° BTDC. If during idling conditions the engine speed wanders from the idle engine speed range, it will encounter a rapid change in the ignition timing that encourages it to remain in the desired range. In this sense, the steep timing changes or ramps located on either side of the desired RPM range serve as idle speed controllers. If the operator opens the throttle of the engine, however, the quick increase in RPMs easily removes the ignition timing from the idle engine speed range so that one of the specific timing sequences, such as Acceleration sequence 108, or the higher RPM timing values of the timing table are used instead to control the ignition timing.

In a preferred embodiment, the idle engine speed range has an ignition timing that is approximately 2° BTDC and extends across no more than 1,000 RPM (even more preferably, it extends across approximately 200 RPM). If the engine speed falls below the idle engine speed range, then electronic processing device 60 provides an ignition signal that causes a rapid timing advance so that the engine speed is encouraged to stay within the idle engine speed range. Desirably, the rapid timing advance advances the ignition timing by at least 20° when compared to the ignition timing of the idle engine speed range, and even more preferably the rapid timing advance is approximately 33° (2° BTDC to 35° BTDC). This type of rapid timing advance is helpful in the event that the engine speed gradually wanders below the idle engine speed range, for example, such as the case when the engine ingests a puddle of fuel. If, however, the engine experiences quick and pronounced decreases in its speed, then control for the ignition timing could pass right through the 2,900 RPM mark and would be dictated by one of the lower RPM entries in the timing table.

Conversely, if the engine speed gradually increases above the idle engine speed range, then an ignition signal is provided that causes a rapid timing retard so that the engine speed is encouraged to stay within the idle engine speed range. The rapid timing retard desirably retards the ignition timing by at least 10° when compared to the ignition timing of the idle engine speed range, and even more preferably the rapid timing retard is approximately 22° (2° BTDC to 20° ATDC). A rapid timing retard such as this is helpful in the event that the engine speed gradually wanders above the idle engine speed range, for example, such as the case when the engine ingests an air bubble from the carburetor. On the other hand, a quick and pronounced increase in engine speed, such as when the operator opens the throttle of the engine, causes control for the ignition timing to pass right through the 3,100 RPM mark so that the ignition timing is dictated by one of the higher RPM entries in the timing table or by one of the specific operating sequences, such as the Acceleration sequence. Therefore, the Normal Mode sequence 106 does not work against an operator who is throttling the engine.

With reference back to FIG. 3, decision step 124 determines whether or not operation of the system will enter Acceleration sequence 108. If the rate of change between the latest engine speed reading and either the previous reading or several previous readings exceeds a predefined amount, 300 RPMs within 1 revolution in the preferred embodiment, then the control system will enter Acceleration sequence 108, as will be further explained. If the rate of change in engine speed does not exceed this threshold amount, then operation will pass to decision step 126.

Like step 124, step 126 checks for unusual engine operating conditions; conditions that warrant the control system entering specific sequences designed to combat those unusual circumstances. Decision step 126 checks to see if the engine speed is dropping after exceeding a predetermined RPM, such as 6500 RPM. If so, Come Down sequence 110 is initiated such that the speed of the engine is quickly brought back to normal operating levels, as will also be explained in further detail. If the engine speed does not satisfy the prerequisites for initiating Come Down sequence 110, then control remains in Normal Mode sequence 106 and is passed to step 128.

Step 128 determines whether or not Recovery Bump sequence 112 needs to be called upon to avoid a potential engine stall. If the engine is running at a low RPM then the Recovery Bump sequence is used to increase the engine speed, if not the Normal Mode proceeds to step 130. Step 130 determines if the engine has been maintained in a certain 'part-throttle' RPM range for a predetermined number of engine revolutions, and if so calls upon the Part Throttle sequence 114, as will be subsequently explained in greater detail.

Step 132 determines the Overall Timing value by adding the Advance value, which was found using the look up table in step 122, to the BaseTime value. Because the BaseTime value was set to zero in step 122, that value will remain zero unless otherwise changed. Step 134 sends an Ignition signal to direct the discharge of capacitor 62 according to the Overall Timing value found in step 132. Following this triggering, decision step 136 checks to see if the operator has engaged the kill switch. If the kill switch is engaged, the system immediately shuts the engine down and exits the sequence. If the kill switch has not been engaged, then control passes to the engine speed sensing step 120, and the Normal Mode sequence repeats itself. Thus, the Cranking and Warm Up sequences are only engaged following the starting of the engine, afterwards the control system of the present invention operates in a Normal Mode 106 until certain circumstances cause the operation to transfer to specific sequences designed to operate the engine optimally in light of those circumstances.

Figure 4:
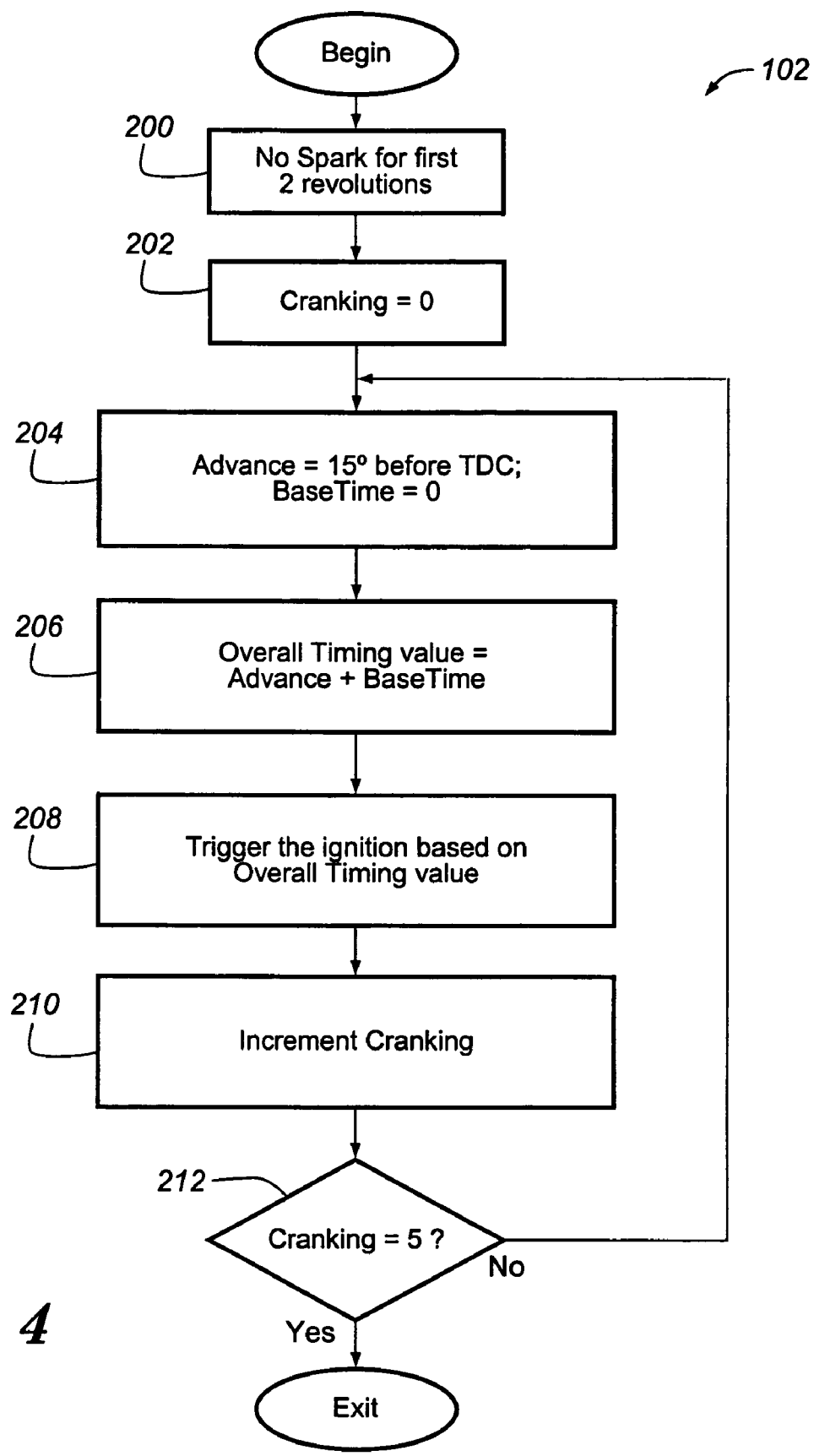
FIG. 4 is a flowchart showing an embodiment of the Cranking sequence of FIG. 3.

Referring now to FIG. 4, there is shown the Cranking sequence 102, which is initiated immediately following engine startup and provides an independently tailored operating sequence for the starting event. By utilizing this specifically designed sequence, the ignition timing can be controlled in an optimal fashion without being limited by the requirements associated with normal idling. As seen in step 200, the ignition timing control system preferably does not produce a spark for the first two engine revolutions. This "no spark" event is executed in order to allow the discharge capacitor to store more energy, thus producing a "hotter" spark, and to allow a "wetting" of the intake track. Both of these consequences improve the combustion characteristics once the combustion process is initiated. Step 202 resets a Cranking variable to zero and is only encountered once per Cranking sequence operation. Step 204 sets the Advance timing variable to a predetermined value, 15° BTDC in the preferred embodiment, and the BaseTime value to 0°. In a manner similar to that used in step 130 of the Normal Mode sequence, step 206 sums the Advance and BaseTime values together, thereby calculating an Overall Timing value. Thus, the ignition timing during the Cranking sequence is a constant value that is determined irrespective of the current engine speed. Step 208 sends an ignition signal to trigger a high voltage ignition pulse across a spark gap according to the Overall Timing value. After the Cranking sequence has directed an ignition discharge, the Cranking variable is incremented, step 210, and checked in decisions step 212. If the Cranking value has not reached a predetermined number of revolutions, such as 5, then the process is repeated. If Cranking has in fact reached 5, then the Cranking sequence is exited and control of the system is passed to Warm Up sequence 104.

In operation, the Cranking sequence of the preferred embodiment will only control the control system for the first 7 engine revolutions following engine startup, after which, control passes to the Warm Up sequence. The first 2 revolutions are "no spark" revolutions while the next 5 revolutions set the Overall Timing value to 15° BTDC and increment an engine revolution counter. Once the counter equals 5, the Cranking sequence is exited and the Warm Up sequence begins.

Figure 5A:
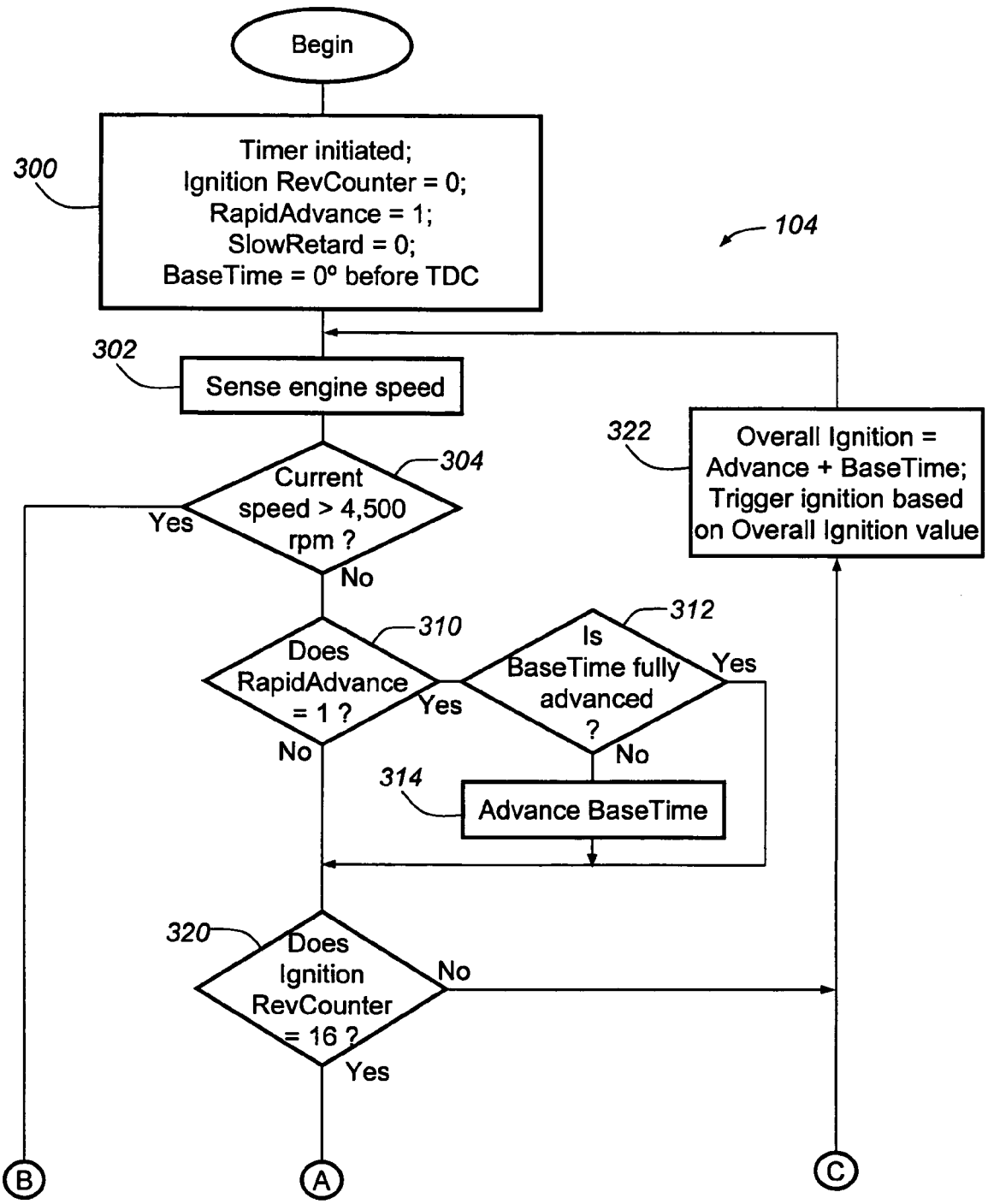
FIGS. 5a–b are flowcharts showing an embodiment of the Warm Up sequence of FIG. 3.
Figure 5B:
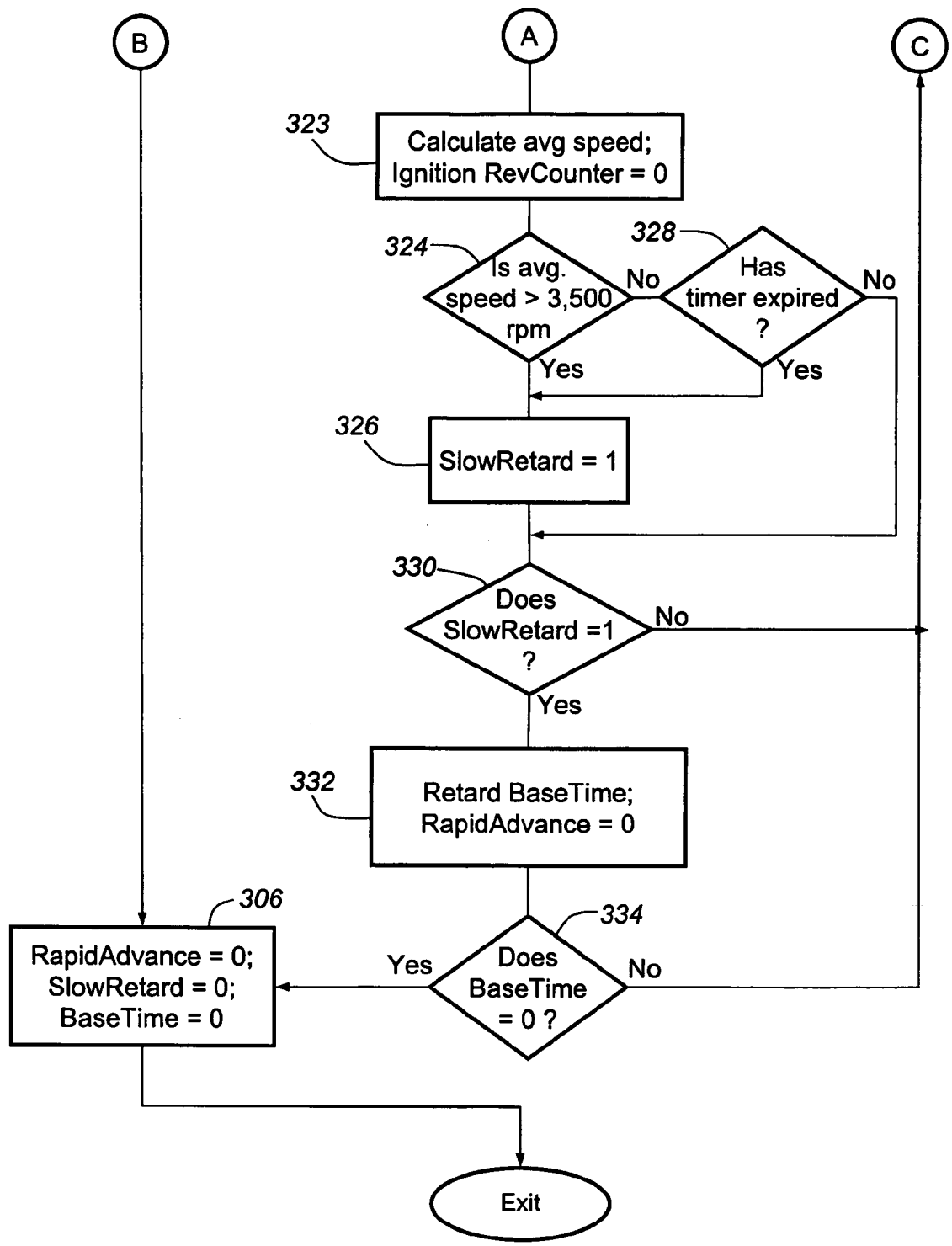

Referring now to FIGS. 5a–5b, the control system 12 of the present invention is described according to Warm Up sequence 104, which is initiated immediately following the Cranking sequence. This sequence is designed to quickly bring the engine to normal operating conditions by advancing the ignition timing as needed, a technique that reduces the chance of engine stall by encouraging the engine to operate at a higher speed. After entering the Warm Up sequence, step 300 initializes several variables and resets an internal timer. The variable Ignition RevCounter counts the number of engine revolutions and is set to zero, the RapidAdvance flag is set to 1, the Slow Retard flag is set to zero, and the BaseTime value is set to 0° before TDC. Step 302 senses and stores a value representative of the current engine speed, which decision step 304 compares to a predetermined amount, such as 4,500 RPM, to determine if it is necessary to continue with the Warm Up sequence. If the current speed exceeds 4,500 RPM the engine is already operating at a high enough speed and further timing advance is unnecessary. Thus, the Warm Up sequence is exited by proceeding to step 306 (FIG. 5b), which sets the RapidAdvance and SlowRetard flags to zero, as well as setting the BaseTime value to 0° before returning control back to the Normal Mode.

Referring back to step 304, assuming the current engine speed is less than 4,500 RPM, then the Warm Up sequence proceeds to step 310, which checks the state of the RapidAdvance flag. If the RapidAdvance flag is 1, which it is on the initial time through the sequence due to step 300, then step 312 determines whether or not the BaseTime value has been fully advanced. In the preferred embodiment, fully advanced corresponds to a Base Time value of 30° before TDC, which is added to the Advance value to determine the overall ignition timing for that revolution. However, on the first time through the sequence the BaseTime value is 0° before TDC, and therefore is not representative of the fully advanced condition. Thus, the sequence proceeds to step 314 which advances the BaseTime value by ⅓° per engine revolution. Accordingly, 90 engine revolutions would result in a total BaseTime advancement of 30°. If the BaseTime value is already fully advanced, then there is no need for further advancement and the sequence proceeds to the revolution incrementer seen in step 316. This step increments the variable Ignition RevCounter such that it keeps a running total of the number of engine revolutions that have occurred since it was set to zero; that counter is checked in step 320 to see if it has reached 16 revolutions. This number was chosen for the particular embodiment described, but could also just as easily be a different predetermined amount. If Ignition RevCounter has not reached 16, as is the case during the first time through the sequence, then step 322 determines the Overall Timing value by adding the Advance value, which is found through an engine speed vs. ignition timing look up table, to the BaseTime value. The ignition timing control system then sends an Ignition signal which triggers an ignition pulse according to the Overall Timing value just calculated. Following this, control of the sequence returns to step 302 such that a new engine speed value may be taken. Assuming the current speed of the engine never exceeds 4,500 RPM, this series of steps continues until Ignition RevCounter equals 16.

Once Ignition RevCounter does equal 16, control passes to step 323 (FIG. 5b) which determines the average engine speed over the previous 16 engine revolutions and resets Ignition RevCounter to zero. Decision step 324 considers whether the average speed just calculated exceeds 3,500 RPM. If so, the engine is already operating at a sufficiently high speed, thus, the SlowRetard flag is set to 1, step 326, such that the WarmUp sequence begins to gradually retard the Overall Timing by retarding the BaseTime value. If the average speed does not exceed 3,500 RPM, decision step 328 additionally asks if the timer has expired. Because the WarmUp sequence is intended to control the ignition timing just until the engine is warm, if the timer expires but the average engine speed remains less than 3,500 RPM, the WarmUp sequence will also begin to gradually retard the timing by slowly decreasing the BaseTime value. Decision step 330 determines whether or not the SlowRetard flag has been set. If the flag has not been set (SlowRetard=0), then step 322 calculates the overall timing according to the method previously described, and control again flows to step 302. If the flag has been set, then step 332 retards BaseTime by ⅓° and the RapidAdvance flag is set to zero. Decision step 334 determines if the BaseTime has been reduced to a value of zero. If not, the sequence proceeds to step 322 and the ignition timing is calculated. If the BaseTime is equal to zero, then step 306 sets the RapidAdvance and SlowRetard flags to zero, and the Warm Up sequence is exited.

In operation, Warm Up sequence 104 adjusts the BaseTime value, thus adjusting the Overall Timing value, until either the current engine speed exceeds a predetermined amount or the BaseTime value has been reduced to zero, at which time the sequence is exited and the Normal Mode sequence begins. As previously addressed, the current speed of the engine is sampled and stored each revolution at step 302. As long as the RapidAdvance flag is set to 1 and the BaseTime value is not fully advanced, BaseTime will be incremented ⅓° per revolution of the engine. If the BaseTime value becomes fully advanced but the RapidAdvance flag is still set to 1, the WarmUp sequence will cycle through steps 302, 304, 310, 312, 320 and 322 until the Ignition RevCounter is equal to 16. After every $16^{th}$ engine revolution the average speed will be calculated, and for those instances where either the average speed exceeds a predetermined value or the timer has expired, the Warm Up sequence will begin gradually retarding the timing by decreasing the BaseTime value ⅓° per 16 revolutions. This rate of change is less than the rate of change for advancing the BaseTime value. Hence, the ignition timing is advanced (RapidAdvance) at a much faster rate than it is retarded (SlowRetard). Once the BaseTime value has been retarded such that it equals 0 or the current engine speed is greater than a predetermined value, the Warm Up sequence is exited. Following the exit of the Warm Up sequence, the Normal Mode sequence 106 begins.

Figure 6:
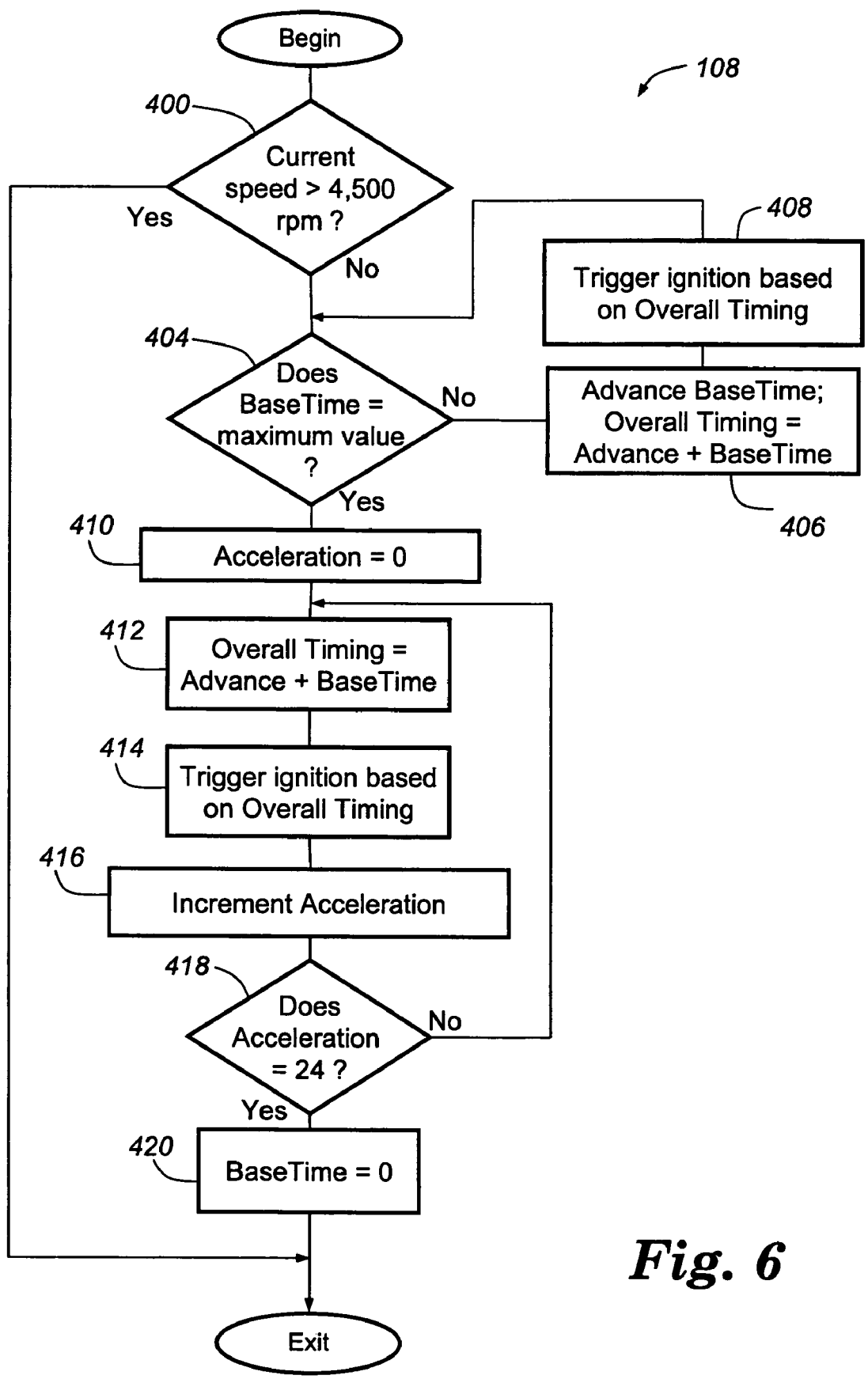
FIG. 6 is a flowchart showing an embodiment of the Acceleration sequence of FIG. 3.

Referring now to FIG. 6, Acceleration sequence 108 momentarily advances the ignition timing when the speed of the engine has increased by a predetermined amount over a certain amount of time. The exact value of the acceleration required to trigger this sequence varies depending on the specific engine and application involved, however, in the preferred embodiment the triggering acceleration is a change of 100 RPM within 1 revolution. Decision step 400 begins by determining if the current speed of the engine is greater than 4,500 RPM; if so, the Acceleration sequence is exited. If the current engine speed does not exceed 4,500 RPM, then decision step 404 determines whether or not the BaseTime value has already reached a predefined maximum value or not; 30° before TDC in the preferred embodiment. If the maximum value has not yet been reached, then step 406 advances the BaseTime value by a predetermined amount, such as 10°, and calculates the Overall Timing value. Following, step 408 triggers an ignition pulse by transmitting an Ignition signal based on the Overall Timing value. This loop will continue until the BaseTime value equals the maximum amount, at which time step 410 is encountered. Step 410 sets the variable Acceleration to zero, such that the ignition is triggered according to the maximum BaseTime value for a certain number of engine revolutions. Accordingly, steps 412 and 414 calculate the Overall Timing value and send the ignition trigger signal, respectively. Afterwards, step 416 increments the Acceleration value, which is then checked by decision step 418. If the Acceleration counter has not yet reached a prescribed amount of revolutions, 24 in the preferred embodiment, then control passes back to step 412, and the Overall Timing value is again determined. Once the counter Acceleration equals 24, step 420 resets BaseTime to 0 and the Acceleration sequence is exited.

Figure 7A:
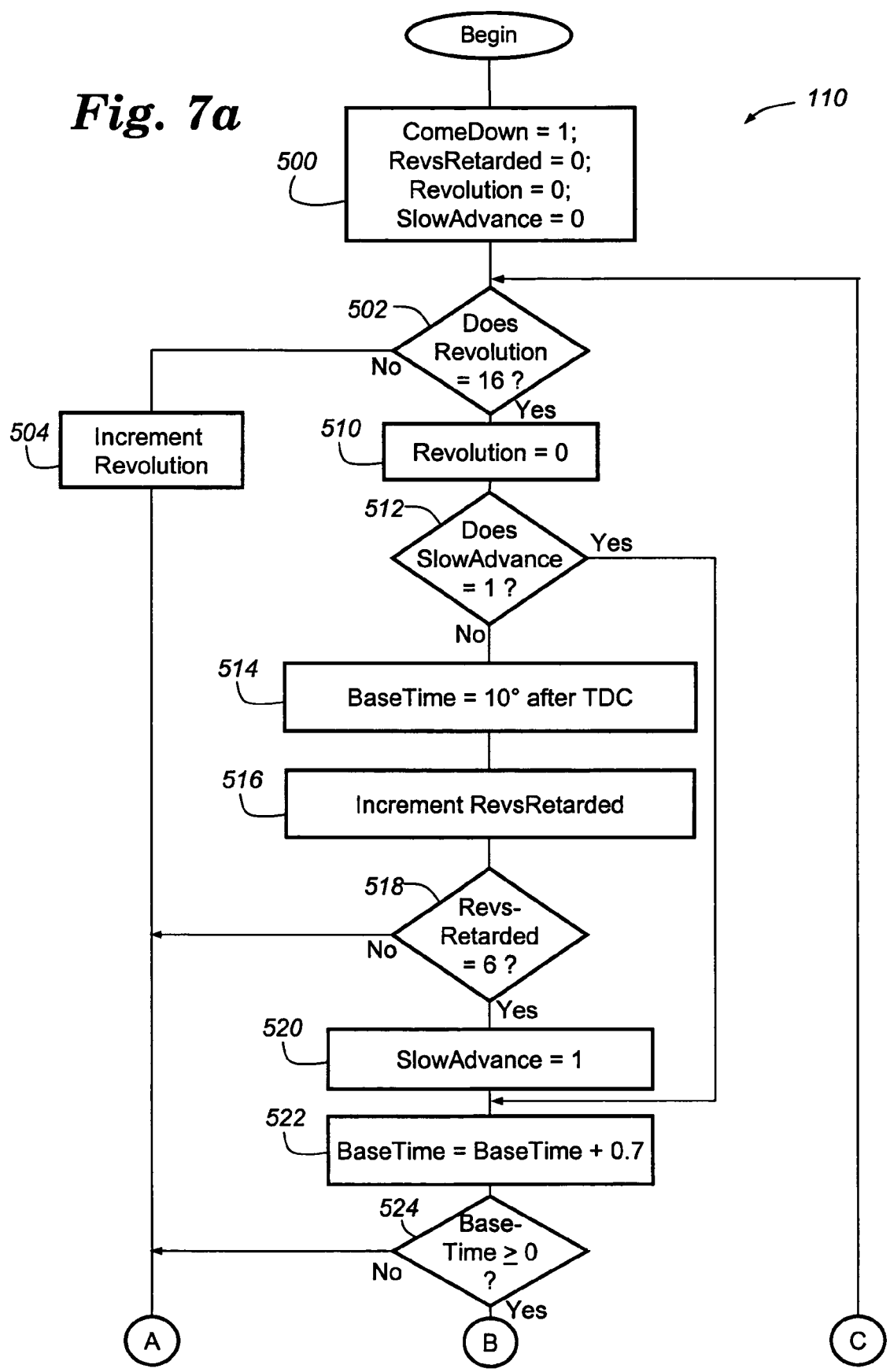
FIGS. 7a–b are flowcharts showing an embodiment of the Come Down sequence of FIG. 3.
Figure 7B:
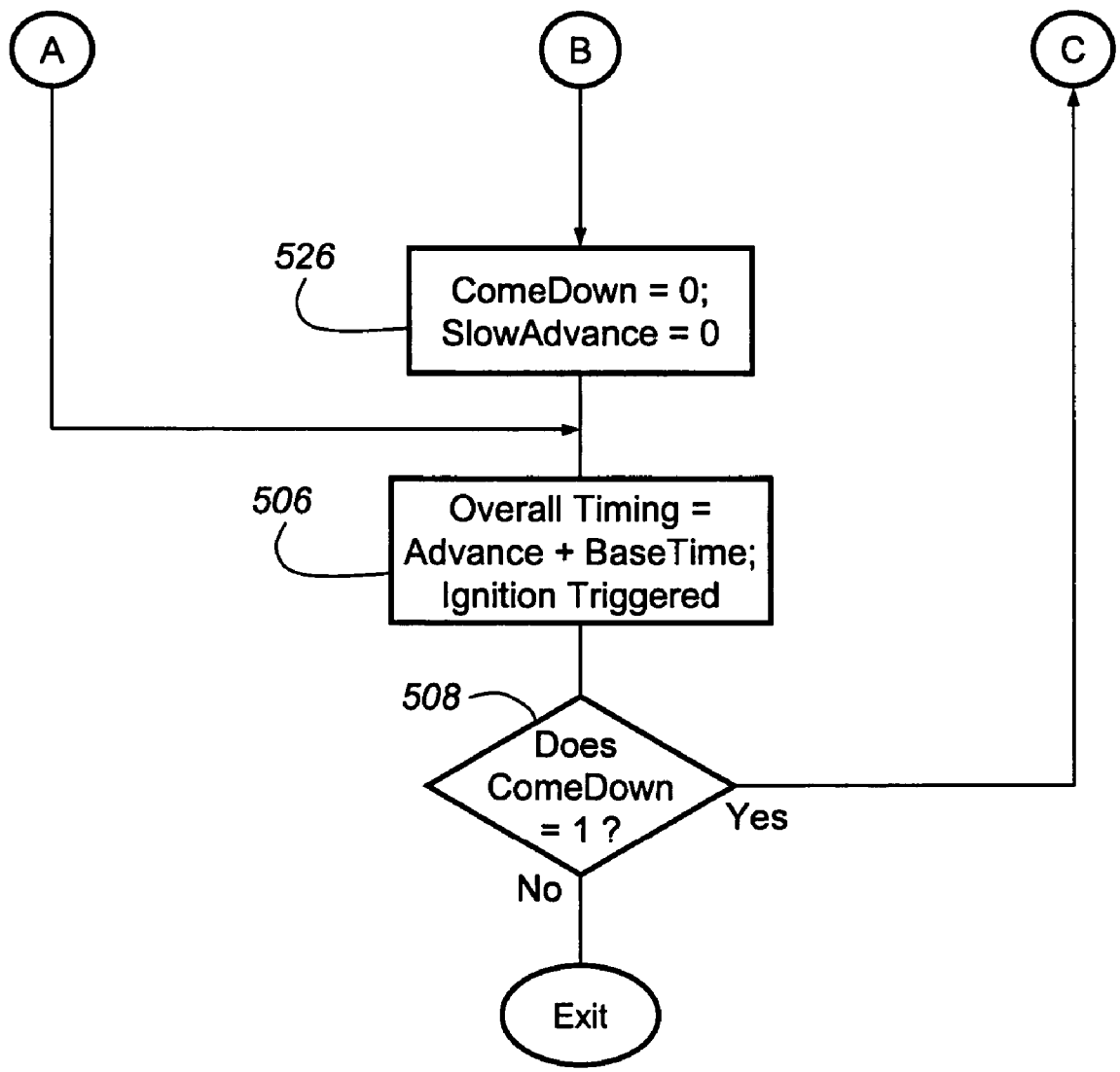

In order to activate Come Down sequence 110, decision step 126 in FIG. 3 needs to detect a significant drop in engine speed after noting engine speed operation at a heightened level. More specifically, the Come Down sequence is called upon when an engine speed exceeding 6,500 RPMs is sensed, followed by 16 revolutions at a speed below 4,000 RPM. With reference to FIGS. 7a–b, Come Down sequence 110 is seen in greater detail. Step 500 sets the ComeDown flag to 1, the RevsRetarded and Revolution counters to zero, and the SlowAdvance flag to zero. Next, decision step 502 determines if the Revolution counter has reached 16. If not, step 504 increments Revolution and control is passed to step 506, which determines the Overall Timing value by adding Advance to BaseTime and is seen in FIG. 7b. Since Advance is equal to the value determined in step 122 and BaseTime is equal to zero due to the same step, the Overall Timing value equals the Advance value. If the ComeDown flag is still 1, as it was set in step 500, then step 508 sends control back to step 502 and this cycle continues until the Revolution counter has been incremented to a value of 16.

If the Revolution counter reaches 16, then step 510 resets Revolution to zero, and step 512 checks the SlowAdvance flag. If SlowAdvance equals 0, as it was initially set, then step 514 retards BaseTime to 10° after TDC. Step 516 increments the RevsRetarded counter, which is then checked by decision step 518 to see if the counter equals a predetermined number, 6 in the preferred embodiment. If the answer to step 518 is no, then the Overall Timing is calculated and Ignition pulse triggered according to step 506, as previously explained. If step 518 determines that RevsRetarded has reached the prescribed limit, then the SlowAdvance flag is set to 1, step 520, and the BaseTime value is increased by 0.7° per 16 revolutions, step 522. Decision step 524 determines if BaseTime is yet greater than or equal to 0 (remembering that thus far in the ComeDown sequence BaseTime has been zero or a negative number since it was retarded). If not, control passes to step 506. If the BaseTime value has already been reduced to zero, then the ComeDown and SlowAdvance flags are set to zero at step 526. This causes the system to exit the Come Down sequence when it reaches step 508, for the Come Down flag no longer equals 1.

Figure 8A:
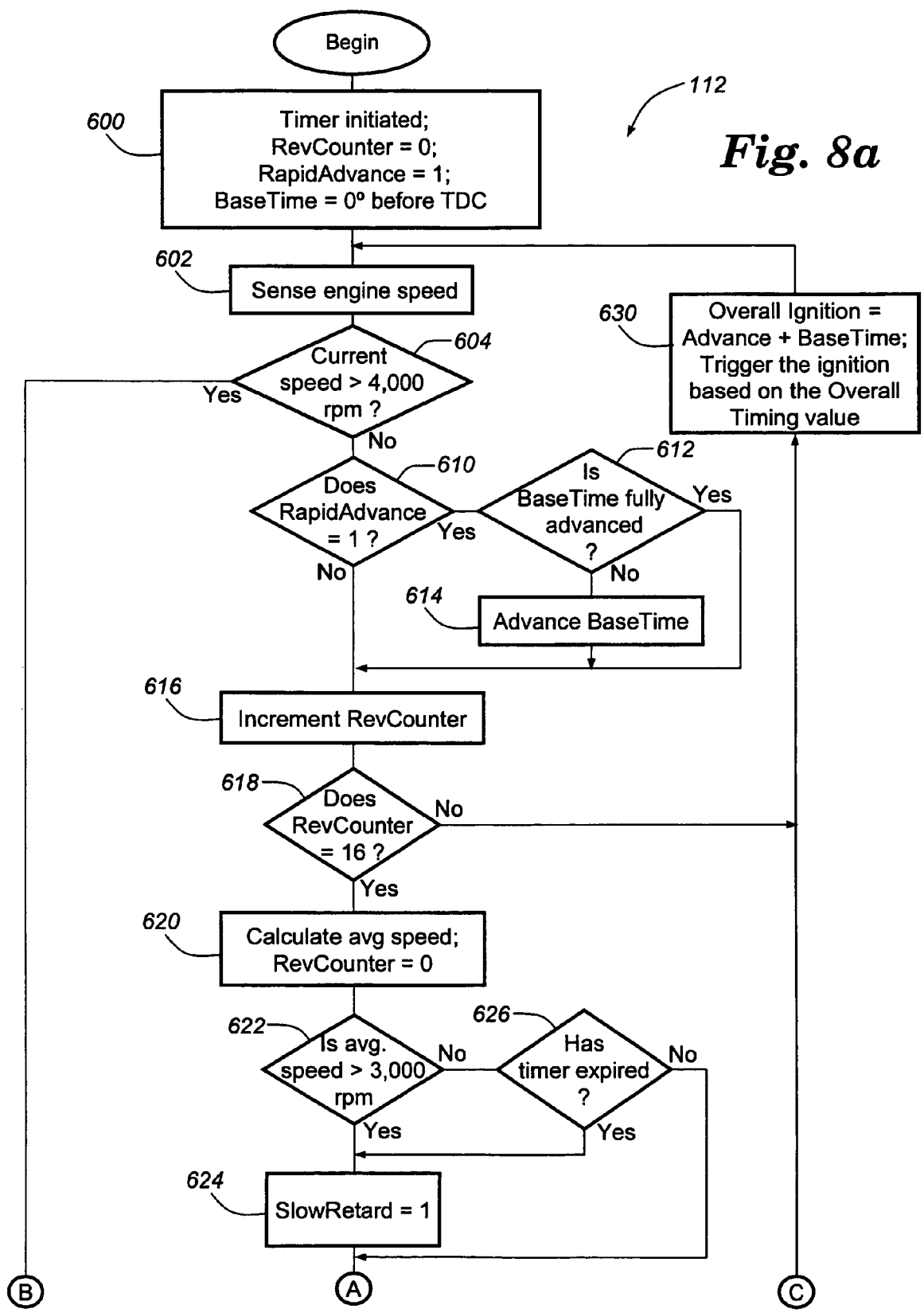
FIGS. 8a–b are flowcharts showing an embodiment of the Recovery Bump sequence of FIG. 3.
Figure 8B:
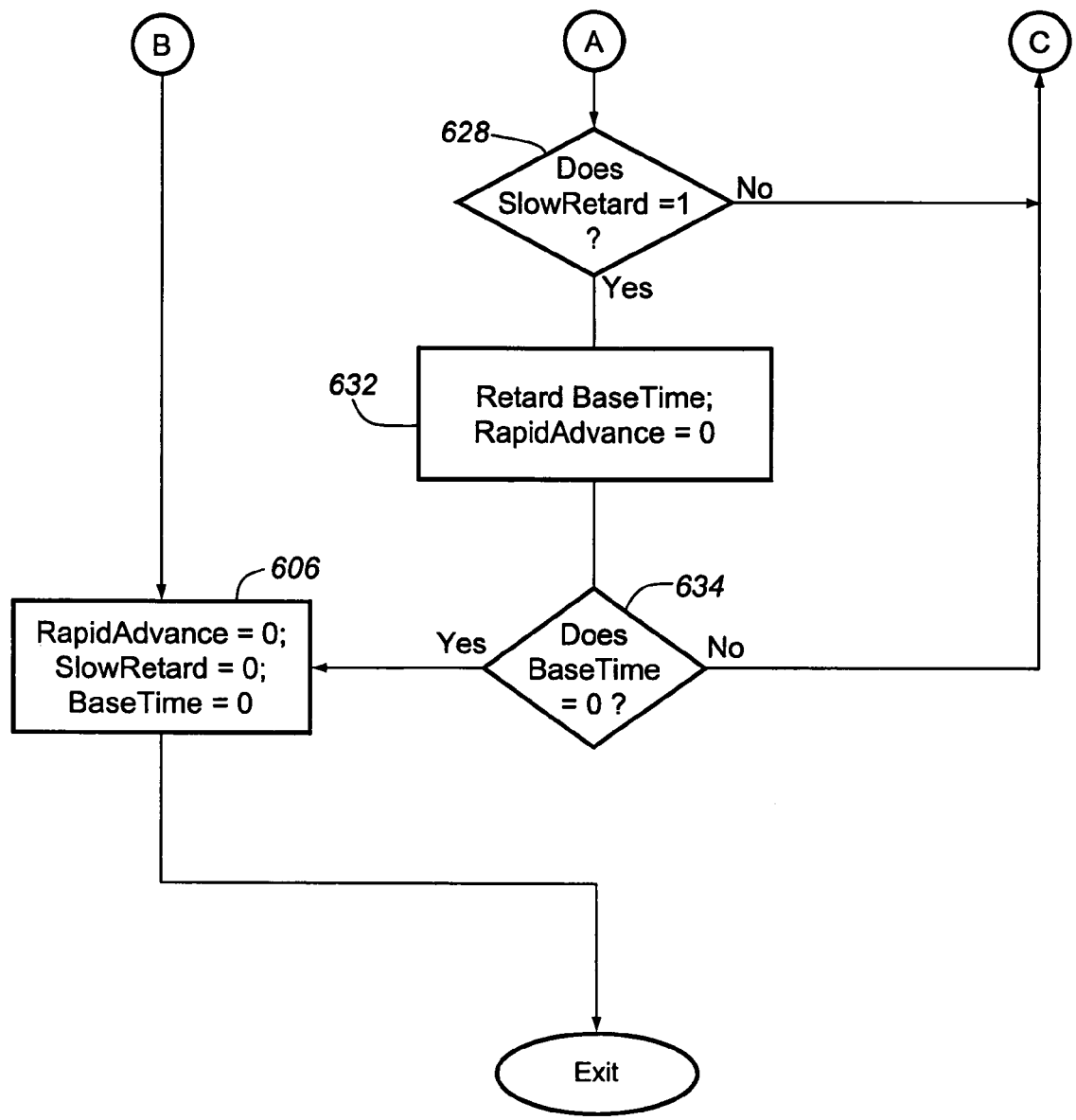

Referring now to FIGS. 8a–b, there is shown the Recovery Bump sequence 112 which is engaged when Normal Mode operation senses that the current engine speed has fallen below a certain predefined level, namely 2,400 RPMs. The general purpose of the Recovery Bump sequence is to increase the engine speed by temporarily advancing the ignition timing beyond its normal position, thereby decreasing the chance for an engine stall. The Recovery Bump sequence is similar in operation to the Warm Up sequence previously described, and begins by initiating a timer, setting the RevCounter variable to zero, setting the RapidAdvance flag to 1, and setting the BaseTime value to 0° before TDC, step 600. Following initialization step 600, step 602 takes a current engine speed sample. If the current engine speed exceeds 4,000 RPM, as determined by decision step 604, the engine speed is already high enough and it is unnecessary to run the Recovery Bump sequence. Accordingly, step 606 resets the RapidAdvance and SlowRetard flags and the BaseTime value to zero. Following this step, control of the ignition timing exits the Recovery Bump sequence.

If the current engine speed does not exceed 4,000 RPMs, then decision step 610 checks the RapidAdvance flag. If this flag is 1, which it was initially set to, step 612 checks to see if the BaseTime value has been fully advanced. If not, then 614 advances the BaseTime value by a predetermined amount. If the BaseTime value is already fully advanced, it is undesirable to advance it further. Following these steps, the increment counter seen in step 616 increments RevCounter and then compares that value to 16, or any other predetermined number of engine revolutions. If step 618 determines that RevCounter is less than 16, step 630 calculates the Overall Timing value by adding the Advance value to the current BaseTime value and sends an Ignition signal accordingly. If RevCounter does equal 16, then an average speed is calculated over the last 16 revolutions, step 620, by averaging each of the engine speed values that were sampled in step 602. Also, the RevCounter is set again to zero. If decision step 622 finds that the average speed over those 16 revolutions exceeds 3,000 RPMs, then it is determined that additional timing advance is not needed and step 624 sets the SlowRetard flag is set to 1. If the average speed is under 3,000 RPMs, it is still necessary to check the timer that was initiated in step 600. If decision step 626 determines that the timer has already expired, then the SlowRetard flag is again set to 1, however, if that timer has not yet expired, the SlowRetard flag remains at zero. The status of that flag is checked at 628 and control of the ignition timing is sent to 630 to determine the Overall Timing value. If step 628 finds that the SlowRetard flag has been set, step 632 will retard the BaseTime value and RapidAdvance will be set to zero. Finally, step 634 checks the value of the BaseTime such that if that value has been fully reduced to zero, then the Recovery Bump sequence is exited via step 606. If the BaseTime value has not been reduced to zero, then the Overall Timing value is determined again according to step 630 and control returns to step 602.

In operation, the Recovery Bump sequence adjusts the BaseTime value, thus adjusting the overall ignition timing, until either the current engine speed exceeds a predetermined amount or the BaseTime has been reduced to zero, at which time the sequence is exited and the Normal Mode sequence 106 resumes. As long as the RapidAdvance flag is set to 1 and the BaseTime value is not fully advanced, BaseTime will be advanced $\frac{1}{3}°$ per revolution of the engine, as seen in step 614. If the BaseTime value becomes fully advanced but the RapidAdvance flag is still set to 1, the Recovery Bump sequence will cycle through steps 602, 604, 610, 612, 616, 618, and 630 until the RevCounter is equal to 16. Every 16th engine revolution the average speed will be calculated, step 620, and for those instances where either the average speed exceeds a predetermined value or the timer has expired, the Recovery Bump sequence will begin gradually retarding the timing by decreasing the BaseTime value $\frac{1}{3}°$ per 16 revolutions. This rate of retarding is $\frac{1}{3}°$ per 16 revolutions, where the rate of advancing is $\frac{1}{30}°$ per revolution. Hence, the ignition timing is advanced (RapidAdvance) at a much faster rate than it is retarded (SlowRetard). Once the Recovery Bump sequence has been exited, the Normal Mode sequence resumes.

Figure 9:
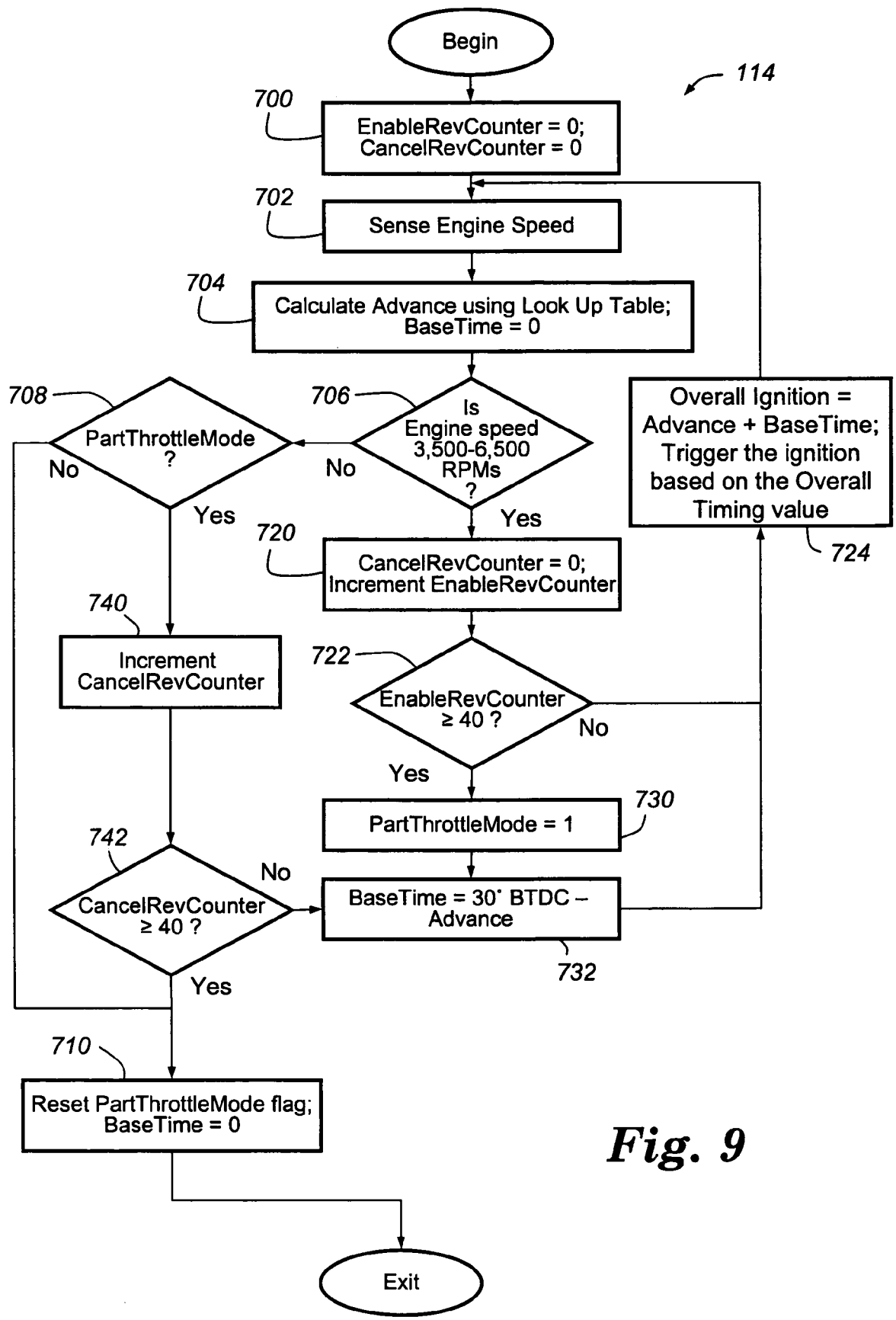
FIG. 9 is a flowchart showing an embodiment of the Part Throttle sequence of FIG. 3.

With reference to FIG. 9, there is an embodiment of the Part Throttle sequence 114, which is called upon when the Normal Mode operation determines that engine speed has been in a predetermined Part Throttle range for a predetermined number of engine revolutions. In a preferred embodiment, step 130 initiates execution of the Part Throttle sequence 114 when it is determined that the engine has been operating in the 3,500–6,500 RPM range for more than 10 engine revolutions. Beginning with step 700, the variables EnableRevCounter and CancelRevCounter are each set to zero. Step 702 then senses the engine speed so that step 704 can determine the Advance value based on an engine speed vs. ignition timing look up table. This table can either have the same entries as the table previously described, or it can be a tailored specifically to the Part Throttle sequence. In either event, BaseTime is set to 0. Next, decision step 706 determines whether the engine is currently operating in a predetermined engine speed range (3,500–6,500 RPMs in this particular embodiment). This predetermined speed range can be the same range as that used to determine whether or not the system should initiate the Part Throttle sequence, or it can be a different range. If the engine is not within the predetermined range, then step 708 asks whether or not the PartThrottleMode is set. During the initial pass through Part Throttle sequence 114, that flag is not yet set. If the answer to step 708 is no, then the PartThrottleMode flag is reset and BaseTime is set to zero, step 710, and the sequence is exited.

If the engine is operating in the predetermined 3,500–6,500 RPM range, then step 706 sends control to step 720 which resets the CancelRevCounter variable and increments the EnableRevCounter variable. Step 722 then determines whether or not the EnableRevCounter variable has reached a certain value; 40 in the preferred embodiment. If it has not, then the Overall Timing Value is calculated as the sum of the Advance and BaseTime values, step 724, and control is sent back to the engine speed sensing stage, step 702. Once the EnableRevCounter variable reaches 40, step 730 sets a PartThrottleMode flag to 1 and step 732 sets the BaseTime value equal to 30° BTDC minus the present Advance value, which was previously determined via a look up table. BaseTime is then passed to 724 and Overall Ignition Timing value will be fixed at 30° BTDC, independent of the current Advance value, as the Overall Ignition Timing=Advance+ (30° BTDC−Advance). By applying a timing value of 30° BTDC, the engine will try to speed up and pull itself out of a "stuck" condition. If the engine spends more than 40 revolutions in the 3,500–6,500 RPM range, it is desirable to encourage the engine to a higher speed, as it is "stuck" or sluggish in that condition. Returning to step 708, if the system is currently in PartThrottleMode (PartThrottleMode=1), then the variable CancelRevCounter is incremented in step 740, and is checked to determine if it has reached a predetermined number in step 742. If CancelRevCounter has reached a predetermined limit, such as 10, then control passes to step 710 for resetting variables and flags before exiting the Part Throttle sequence. If CancelRevCounter has not reached the predetermined limit, then control flows back to step 732 so that the BaseTime value can again be adjusted.

In operation, the Part Throttle sequence 114 is called upon when the engine is operating in a partial throttle mode for a certain number of engine revolutions, and manipulates the ignition timing for optimal performance. The first time through sequence 114, the Advance value is based on an engine speed vs. ignition timing look up table and the BaseTime value is set to 0. As long as the engine speed stays within the partial throttle range (3,500–6,500 RPMs in preferred embodiment) and a certain number of engine revolutions (40 revs) has not been met, the ignition timing will simply be determined by the look up table. Once a predetermined number of engine revolutions have occurred (step 722), the PartThrottleMode flag is set which indicates that the system is operating in a sustained part throttle mode. At this point, the ignition timing is further adjusted (usually advanced) by modifying the BaseTime value, step 732. So long as the engine speed stays within the predetermined range, steps 702, 704, 706, 720, 722, 730, 732 and 724 will continue cycling. If the PartThrottleMode flag has been set to 1 when the engine ceases operating within the predetermined engine speed range, then the system has 40 revolutions to continue operating before the Part Throttle sequence is exited. If at any time during those 40 revolutions the engine speed falls back within the predetermined range, then step 706 again directs the ignition timing to be calculated according to the aforementioned steps. Once the 40 revolutions has expired or if the engine speed falls out of the predetermined range at a time when the PartThrottleMode flag is not set to 1, then the sequence is exited.

The control system previously explained is of an exemplary embodiment, and is intended to include variations which would be obvious to one skilled in the art. For instance, the values for engine speed used to determine the flow of control for the system could be an average engine speed calculated over a predetermined number of engine revolutions instead of a single reading. Thus, before reaching step 124, the Normal Mode sequence could utilize a revolution counter and a loop, for example, such that the engine speed is sampled 16 times and averaged. This technique of averaging the engine speed before making comparisons to predetermined values could also be implemented in the Normal Mode sequence before step 126, or any other applicable step in the operation. Also, the predetermined engine revolution values used for comparison could be modified to take into account various engine performance, environmental, and other considerations.

Moreover, it is also envisioned that the control system of the present invention could improve the spark energy used for combustion by intelligently eliminating the wasted spark produced by discharging the main capacitor on every flywheel revolution of a 4-stroke engine. By sensing which stroke the engine is on, the ignition timing control could eliminate this wasted spark, thereby doubly charging the main discharge capacitor which could then deliver a higher energy, hotter spark on the power stroke. To accomplish this, the ignition timing control turns off the spark every other revolution for a short period of time, possibly during the Normal Mode sequence following the Warm Up sequence. If the engine speed is not adversely affected by this momentary spark shut-off, the ignition control would know the correct engine stroke had been chosen. If the engine speed does drop, the ignition control would know to turn off the spark to the cycle it did not try. This method of delivering a spark only on the power stroke could be implemented into each of the operating sequences previously described.

Furthermore, a decision step could be added to each of the operating sequences that checks for activation of the kill switch. Instead of waiting for control of the ignition timing to pass to step 134 of the Normal Mode sequence, each operating sequence could include a kill switch monitoring decision step, thus decreasing the amount of time required to recognize kill switch activation.

Also, the spark that initiates the combustion process may be generated by methods other than with a capacitive discharge device. For instance, a "flyback" type ignition system provides a primary winding of a transformer with sufficient current and suddenly halts the current such that the surrounding electromagnetic field collapses, thereby producing a high voltage ignition pulse in the secondary winding.

The control system and method disclosed above could also be used with systems that control both ignition timing and air/fuel ratio, such as those systems disclosed in U.S. application Ser. Nos. 10/186,522 filed Jul. 1, 2002 (now abandoned) and Ser. No. 10/765,415 filed Jan. 27, 2004. Both of these applications are assigned to the present assignee and are incorporated herein by reference.

It will thus be apparent that there has been provided in accordance with the present invention an ignition timing control system for use with a low cost, light duty combustion engine which achieves the aims and advantages specified herein. It will of course be understood that the foregoing description is of a preferred exemplary embodiment of the invention and that the invention is not limited to the specific embodiment shown. Various changes and modifications will become apparent to those skilled in the art and all such variations and modifications are intended to come within the spirit and scope of the appended claims.

The invention claimed is:

1. A control system for use with a light duty, non-automotive combustion engine, said system comprising:
    an ignition discharge capacitor coupled to a charge winding for receiving and storing a charge signal,
    an ignition switch coupled to said ignition discharge capacitor for discharging said capacitor and having signal input,
    an input coupled to an engine speed sensor for receiving an electronic speed signal representative of engine speed,
    an output coupled to said ignition switch for providing an electronic ignition signal that causes said ignition switch to discharge said ignition discharge capacitor and affects the ignition timing of the light duty, non-automotive combustion engine, and
    an electronic processing device coupled to said input for receiving said speed signal and coupled to said output for providing said ignition signal, wherein said control system is capable of monitoring the engine speed with said speed signal and is capable of rapidly changing the ignition timing with said ignition signal so that the engine speed is generally maintained in an idle engine speed range when the engine is idling,
    wherein said rapid change in the ignition timing includes a rapid timing advance if the engine speed falls below said idle engine speed range, and a rapid timing retard if the engine speed exceeds said idle engine speed range.

2. A control system as stated in claim 1, wherein said rapid timing advance advances the ignition timing at least 20° with respect to the ignition timing of said idle engine speed range, and said rapid timing retard retards the ignition timing at least 10° with respect to the ignition timing of said idle engine speed range.

3. A control system as stated in claim 2, wherein said rapid timing advance advances the ignition timing by approximately 33° with respect to the ignition timing of said idle engine speed range.

4. A control system as stated in claim 2, wherein said rapid timing retard retards the ignition timing by approximately 22° with respect to the ignition timing of said idle engine speed range.

5. A control system as stated in claim 1, wherein said idle engine speed range extends across no more than 1,000 RPM.

6. A control system as stated in claim 5, wherein said idle engine speed range extends across approximately 200 RPM.

7. A control system as stated in claim 5, wherein the ignition timing during said idle engine speed range is approximately 20 BTDC.

8. A control system for use with a light duty, non-automotive combustion engine, said system comprising:
    an ignition discharge capacitor coupled to a charge winding for receiving and storing a charge signal,
    an ignition switch coupled to said ignition discharge capacitor for discharge said capacitor and having a signal input,
    an input coupled to an engine speed sensor for receiving an electronic speed signal representative of engine speed,
    an output coupled to said ignition switch for providing an electronic ignition signal that causes said ignition switch to discharge said ignition discharge capacitor and affects the ignition timing of the light duty, non-automotive combustion engine, and
    an electronic processing device coupled to said input for receiving said speed signal and coupled to said output for providing said ignition signal, wherein said control system is capable of monitoring the engine speed with said speed signal, rapidly changing the ignition timing with said ignition signal so that the engine speed is generally maintained in an idle engine speed range when the engine is idling, and providing said ignition signal according to an independent operating sequence that is selected by utilizing said speed signal.

9. A control system as stated in claim 8, wherein said independent operating sequence is a part throttle sequence that is initiated when said speed signal indicates that the engine speed has remained in a predetermined engine speed range for a predetermined number of engine revolutions.

10. A control system as stated in claim 9, wherein said part throttle sequence utilizes an engine speed vs. ignition timing look up table to provide said ignition signal so long as the engine speed remains within a second predetermined engine speed range.

11. A control system as stated in claim 1, wherein said speed signal, said charge signal, and a power signal for supplying power to said electronic processing device are each provided by windings that are operatively coupled to magnetic sections of an engine flywheel.

12. A method for controlling the ignition timing of a light duty, non-automotive combustion engine, said method comprising the steps of:
   (a) receiving an electronic speed signal representative of engine speed,
   (b) receiving and storing a charge signal with an ignition discharge capacitor;
   (c) providing an electronic ignition signal that affects the ignition timing of the light duty, non-automotive combustion engine to an ignition switch,
   (d) discharging said ignition discharge capacitor in response to said ignition switch receiving said ignition signal; and (e) rapidly changing said ignition signal when said speed signal indicates that the engine speed is not within an idle engine speed range so that the engine is encouraged to return to said idle engine speed range, wherein said rapid change of said ignition signal includes a rapid timing advance if the engine speed falls below said idle engine speed range, and a rapid timing retard if the engine speed exceeds said idle engine speed range.

13. A method as stated in claim 12, wherein said rapid timing advance advances the ignition timing at least 20° with respect to the ignition timing of said idle engine speed range, and said rapid timing retard retards the ignition timing at least 10° with respect to the ignition timing of said idle engine speed range.

14. A method as stated in claim 12, wherein said idle engine speed range extends across no more than 1,000 RPM.

15. A method for controlling the ignition timing of a light duty, non-automotive combustion engine said method comprising the steps of:
   (a) receiving an electronic speed signal representative of engine speed,
   (b) receiving and storing a charge signal with an ignition discharge capacitor;
   (c) providing an electronic ignition signal that affects the ignition timing of the light duty, non-automotive combustion engine to an ignition switch,
   (d) discharging said ignition discharge capacitor in response to said ignition switch receiving said ignition signal; and
   (e) rapidly changing said ignition signal when said speed signal indicates that the engine speed is not within an idle engine speed range so that the engine is encouraged to return to said idle engine speed range, and
   (d) providing said ignition signal according to an independent operating sequence that is selected by utilizing said speed signal.

16. A method as stated in claim 15, wherein said independent operating sequence is a part throttle sequence that is initiated when said speed signal indicates that the engine speed has remained in a predetermined engine speed range for a predetermined number of engine revolutions.

17. A control system for use with a light duty combustion engine, said system comprising:
   a speed sensor operatively coupled to the engine and having a signal output for providing an electronic speed signal representative of engine speed,
   an ignition switch operatively coupled to a capacitive discharge ignition system and having a signal input for receiving an ignition signal capable of affecting the engine ignition timing, and
   an electronic processing device coupled to said speed sensor output for receiving said speed signal and coupled to said ignition switch input for providing said ignition signal,
   wherein said control system is capable of: i) rapidly changing the ignition timing with said ignition signal so that the engine speed is generally maintained in an idle engine speed range when the engine is idling, and ii) providing said ignition signal according to a part throttle sequence that is initiated when said speed signal indicates that the engine speed has remained in a predetermined engine speed range for a predetermined number of engine revolutions.

18. A control system for use with a light duty, non-automotive combustion engine, said system comprising:
   an input coupled to an engine speed sensor for receiving an electronic speed signal representative of engine speed,
   an output coupled to an ignition switch for providing an electronic ignition signal that affects the ignition timing of the light duty, non-automotive combustion engine, and
   an electronic processing device coupled to said input for receiving said speed signal and coupled to said output for providing said ignition signal, wherein said electronic processing device: i) monitors the engine speed with said speed signal, ii) determines if the engine speed is within a predetermined idle engine speed range that extends across no more than 1,000 RPMs, and iii) modifies the ignition timing from an idle ignition timing by utilizing a rapid timing advance if the engine speed is just below said idle engine speed range, and utilizing a rapid timing retard if the engine speed is just above said idle engine speed range.

19. A control system as stated in claim 18, wherein said rapid timing advance advances the ignition timing at least 20° with respect to the ignition timing of said idle engine speed range, and said rapid timing retard retards the ignition timing at least 10° with respect to the ignition timing of said idle engine speed range.

* * * * *

UNITED STATES PATENT AND TRADEMARK OFFICE
CERTIFICATE OF CORRECTION

| | |
|---|---|
| PATENT NO. | : 7,198,028 B2 |
| APPLICATION NO. | : 11/211835 |
| DATED | : April 3, 2007 |
| INVENTOR(S) | : Martn N. Andersson et al. |

It is certified that error appears in the above-identified patent and that said Letters Patent is hereby corrected as shown below:

Column 15
  Line 62, before "signal" insert --a--.

Column 16
  Line 43, delete "discharge" and insert --discharging--.

Signed and Sealed this

Twenty-sixth Day of June, 2007

JON W. DUDAS
*Director of the United States Patent and Trademark Office*